Aug. 27, 1935. A. CROSSLEY Re. 19,680

TEMPERATURE CONTROL SYSTEM

Original Filed Feb. 11, 1929 4 Sheets-Sheet 1

Inventor

*Alfred Crossley*

By Harold Dodd.

Attorney.

Aug. 27, 1935. A. CROSSLEY Re. 19,680

TEMPERATURE CONTROL SYSTEM

Original Filed Feb. 11, 1929 4 Sheets-Sheet 2

Inventor
Alfred Crossley

By Harold Dodd.
Attorney

TEMPERATURE CONTROL SYSTEM

Original Filed Feb. 11, 1929 4 Sheets-Sheet 3

Inventor

*Alfred Crossley*

By Harold Dodd

Attorney

TEMPERATURE CONTROL SYSTEM

Original Filed Feb. 11, 1929 4 Sheets-Sheet 4

Inventor
Alfred Crossley

By Harold Dodd,
Attorney

Reissued Aug. 27, 1935 Re. 19,680

UNITED STATES PATENT OFFICE 19,680

TEMPERATURE CONTROL SYSTEM

Alfred Crossley, Chicago, Ill.

Original No. 1,884,585, dated October 25, 1932, Serial No. 339,248, February 11, 1929. Application for reissue August 6, 1934, Serial No. 739,353

10 Claims. (Cl. 219—19)

My invention relates broadly to electrical temperature control systems, and more particularly a construction of cabinet in which the temperature is kept substantially uniform.

One of the objects of my invention is to provide a compartment arrangement for a cabinet structure in which the temperature may be readily controlled.

Another object of my invention is to provide a heating and gas circulating arrangement within a main compartment of a cabinet structure for maintaining the temperature within an inner compartment thereof substantially constant.

Still another object of my invention is to provide a plurality of compartments one within another in a cabinet structure and means within the outer compartment for uniformly heating and circulating the medium within it for controlling and maintaining the temperature within the inner container substantially constant.

A further object of my invention is to provide a container, the walls of which are composed of alternate layers of heat insulating and heat conducting material with a heat regulating and circulating arrangement for maintaining a compartment, the walls of which are composed of alternate layers of heat conducting and heat retaining material, positioned within the container at substantially uniform temperature.

A still further object of my invention is to provide a heat control arrangement for frequency stabilizing devices, such as electro-mechanical vibrators, wherein the temperature of the medium surrounding the electro-mechanical vibrator is maintained substantially constant by enclosing the electro-mechanical vibrator within a container positioned within a substantially heat insulated container the inner medium of which is heated and temperature controlled.

According to my invention a temperature control system is provided wherein an outer container is made of a plurality of alternately positioned walls of heat conducting and heat insulating material. A smaller container, the walls of which are also preferably made of a plurality of alternately positioned walls of heat conducting and heat insulating material, is positioned within the outer container. A heat conducting medium consisting of gas or liquid is circulated all around the smaller container by mechanism such as an electric fan. The circulating medium is heated by any suitable heater, such as an electric heating unit which is preferably positioned inside of the outer container adjacent to the fan. A thermostat is supported in the path of the circulating medium for causing the circuit of the heating unit to be either established or interrupted in accordance with any temperature change of the circulating medium. The temperature within the outer container may be thus controlled so that its maximum variation from the mean temperature will not exceed 0.02 degree centigrade.

The temperature within the smaller container which is positioned inside of the outer container and in which the electro-mechanical vibrator element is positioned may be kept from varying more than 0.01 degree centigrade from a mean temperature.

My invention will be more fully understood from the accompanying drawings in which.

Figure 1:
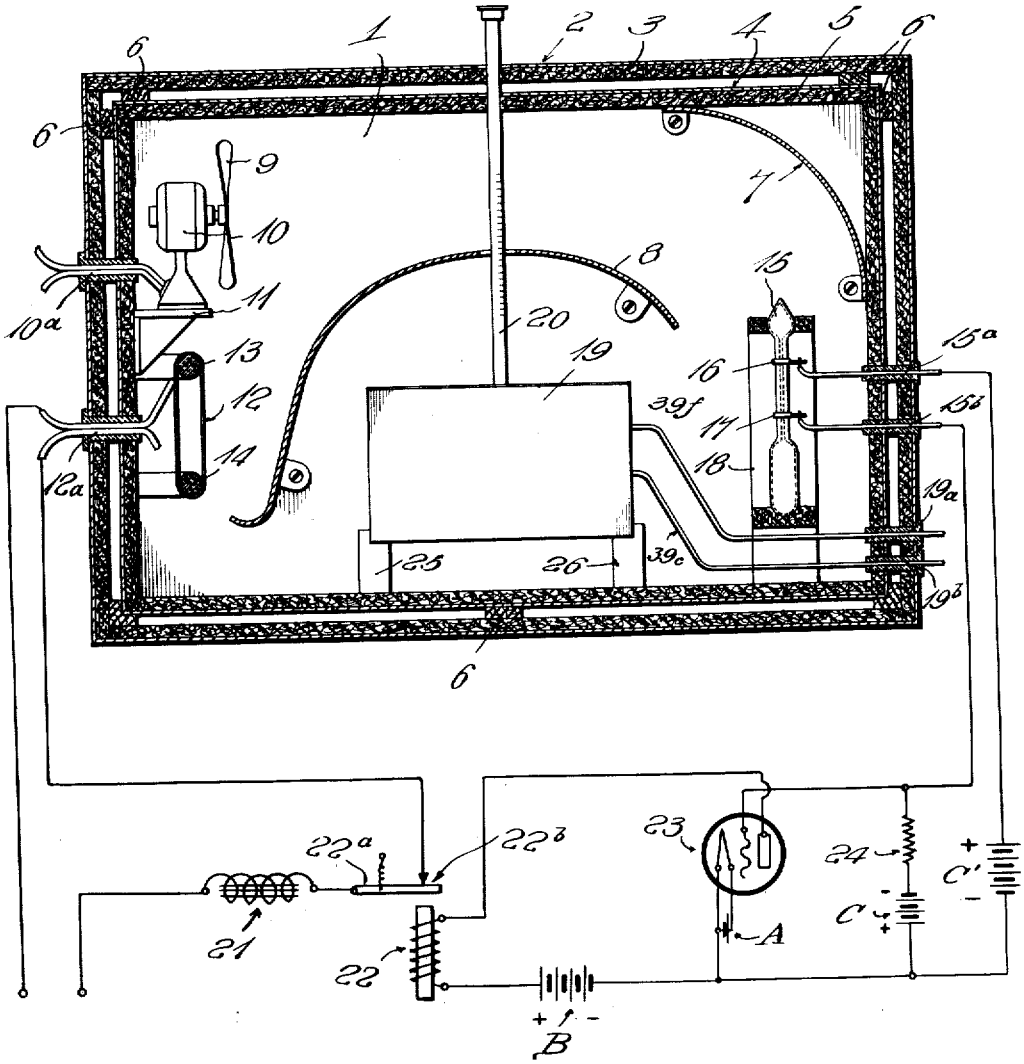
Fig. 1 illustrates a cross-sectional view in front elevation of the preferred embodiment of my invention.

Referring to Fig. 1 of the drawings in detail, reference numeral 1 designates the outer container having walls 2, 3, 4 and 5. Walls 2 and 4 of heat conducting material, such as copper, are positioned against walls 3 and 5 which are of relatively poor heat conducting material, such as wood pulp composition or similar material having a cellular structure, or air.

Spacers 6 are inserted between the walls 3 and 4 to maintain an air space therebetween which also serves as a heat insulating wall. Baffles 7 and 8 are provided inside of the container 1 to guide the circulating medium about the device which is subjected to constant temperature conditions within the container. A fan 9, operated by the motor 10 which is positioned upon the shelf 11 is employed to circulate the enclosed medium, which is preferably air but may be any other gas or liquid, within the container between the baffles 7 and 8. In case liquid is employed as the circulating medium within the container, an additional metallic lining (not shown) must be provided upon the inside of the container. A heating unit 12, which may consist of a windng of an electrical conductor composed of an alloy of nickel, iron and chromium, or any other alloy or metal suitable for use in electrical heaters, supported upon the rods 13 and 14 of mica or other heat resisting material, is positioned upon a wall of the container, preferably adjacent to the fan 9. A thermostat 15 comprising a column of mercury and electrodes 16 and 17 is supported by the structure 18, which is of cellular material within the container. A smaller container 19 is supported by the members 25 and 26 of pulp wood composition or similar material beneath the baffle 8. A thermometer 20 projects through an opening in container 19. Openings are also provided in the walls of the top of the container 1 through which the thermometer 20 is extended so as to facilitate the reading thereof. Bushings 10*a*, 12*a*, 15*a*, 15*b*, 19*a* and 19*b* are provided for the conductors leading to the fan motor 10, the heating unit 12, the thermostat 15 and the container 19, respectively.

Connections are provided between the circuit of the heating unit 12 and the choke coil 21 and circuit interrupting armature 22*a* of the relay 22. The winding of relay 22 is connected in series with the source of current supply B which is connected in the anode circuit of electron discharge device 23. Connections are also provided between the electrodes 16 and 17 of the thermostat 15 and the input circuit of the discharge device 23. The negative electrode of source of grid bias potential C is connected to the grid electrode of discharge device 23 through the high resistance unit 24. The positive electrode of source $C^1$ is connected to an electrode of the thermostat 15. The other electrode of the thermostat is connected to the grid electrode of the electron discharge device 23.

Figure 2:
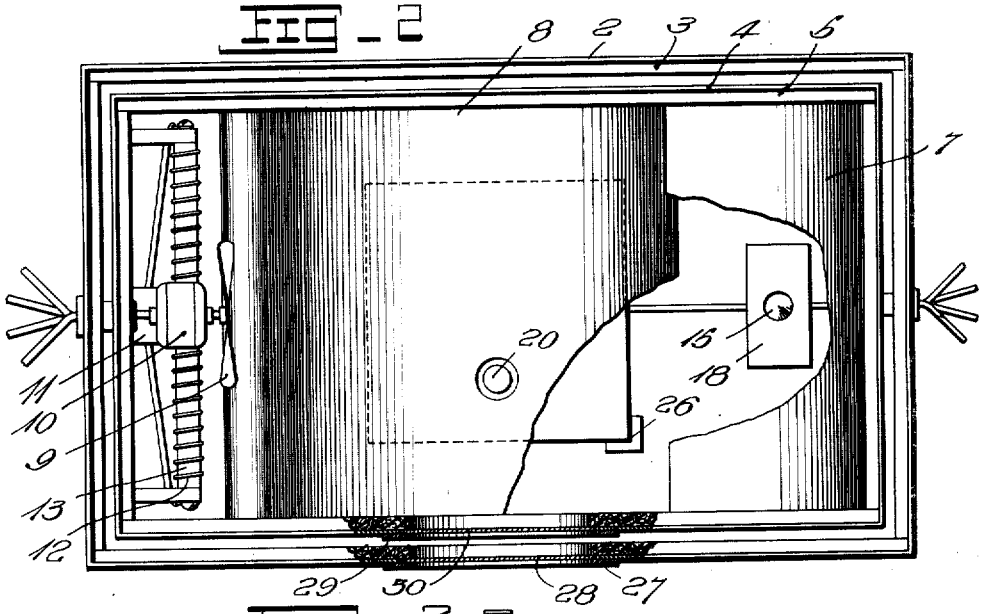
Fig. 2 illustrates a top view in fragmentary cross-section of the preferred embodiment of my invention wherein the cover is removed.
Figure 3:
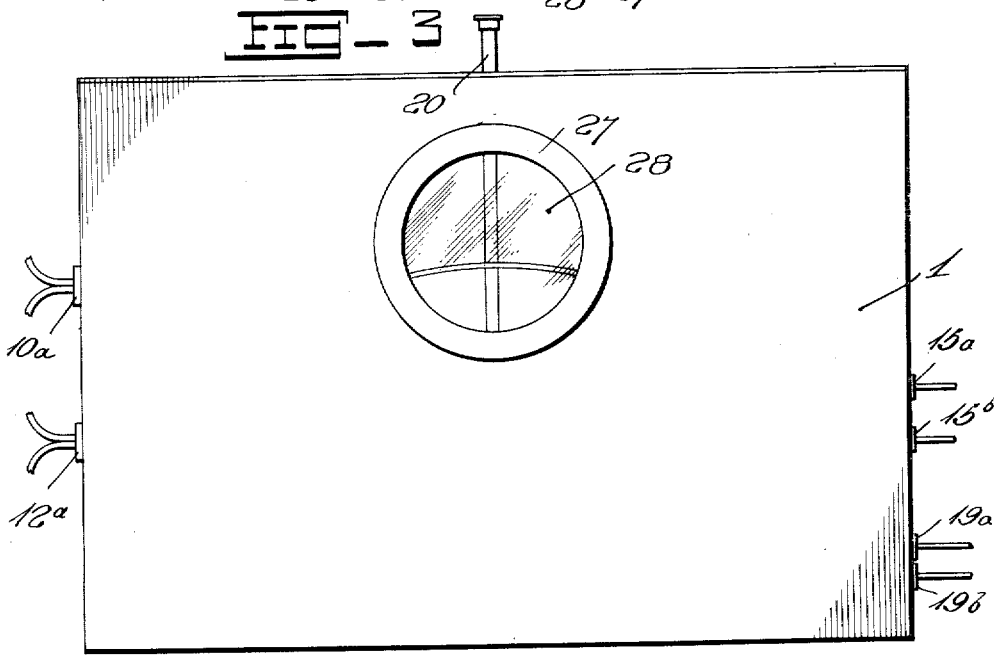
Fig. 3 is a full view in front elevation of the preferred embodiment of my invention.

In Fig. 2 a top view of the cabinet structure wherein the top walls are removed is shown. Openings, having transparent material 28 and 30 held in position therein by rings 27 and 29, which are fastened adjacent to the openings upon the walls 2 and 4 respectively, are provided whereby the observation of the readings of the thermometer 20 is facilitated. The position of these openings is more clearly illustrated in Fig. 3 of the drawings.

Figure 4:
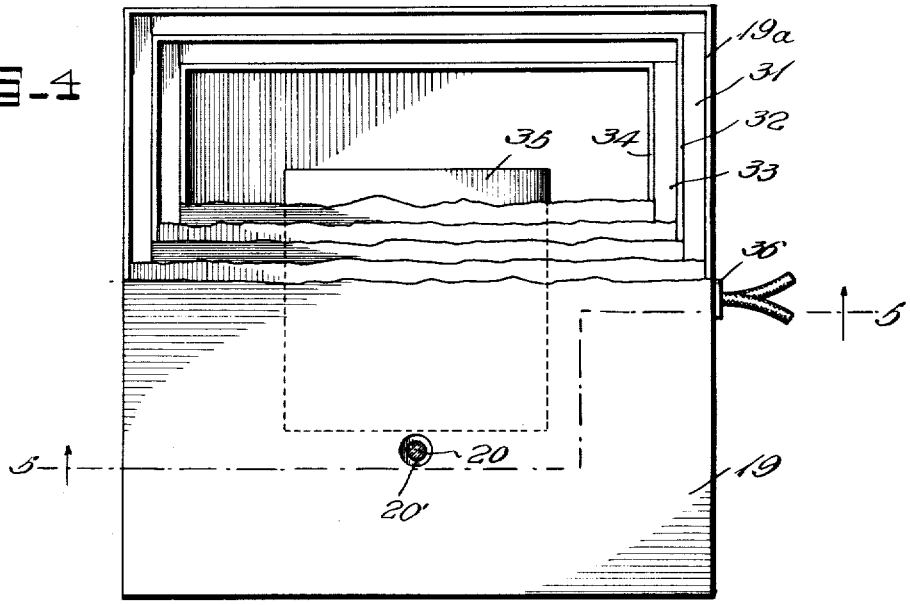
Fig. 4 is a top view in fragmentary cross-section of the inner container showing the container within which the electro-mechanical vibrator is positioned.

A top view of the container 19 in fragmentary section is shown in Fig. 4. Walls 19*a*, 32 and 34 of heat conducting material, such as copper or aluminum, having positioned therebetween walls 31 and 33 of heat retaining materal, such as wood pulp composition or phenol condensation products are arranged within the container 19.

Figure 5:
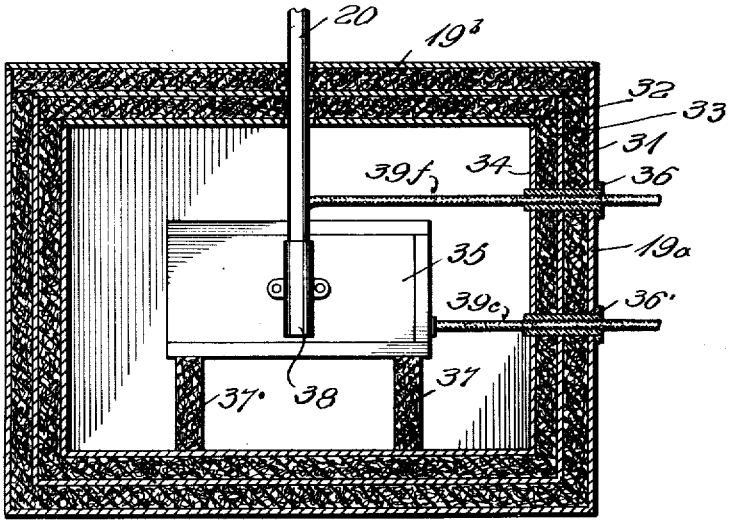
Fig. 5 is a vertical sectional view along the line 5—5 of Fig. 4.

A removable cover 19*b* composed of alternately disposed walls of heat conducting and heat retaining material is also provided for the container. An opening 20′ through which the thermometer 20 projects into the container is provided in the top 19*b*. Bushings 36, 36′ through which conductors are led into the container are positioned in openings in one of the sides. Supports 37, 37′ of heat insulating material similar to that of which the walls 31 and 33 are composed, serve to support the compartment 35 as shown in Fig. 5 of the drawings. Socket member 38 for retaining the thermometer 20 directly against or adjacent the compartment 35 is supported upon one side of the compartment as shown.

Figure 6:
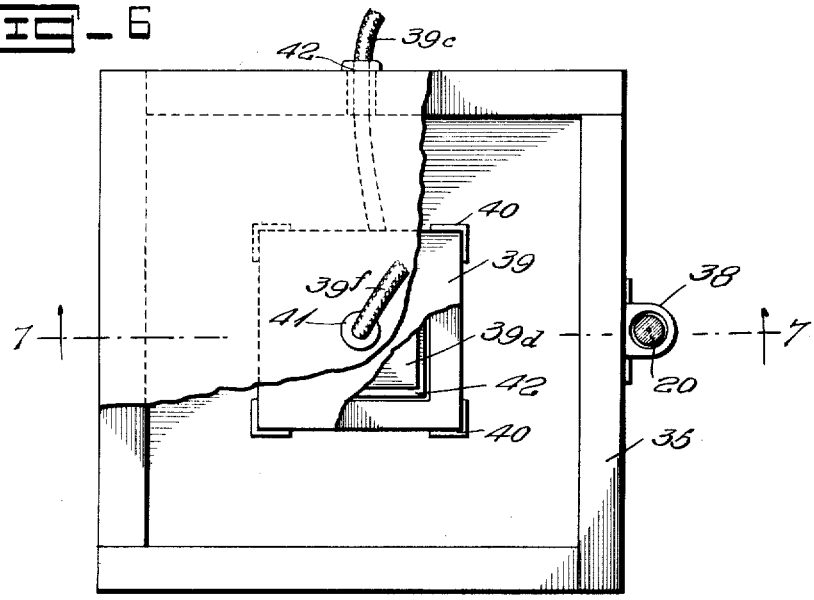
Fig. 6 is a top view in fragmentary cross-section of the container housing the electro-mechanical vibrator.
Figure 7:
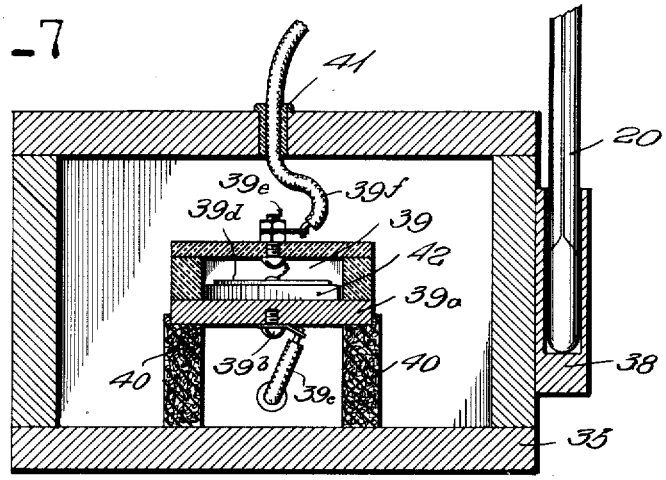
Fig. 7 is a cross-sectional view in vertical elevation along the lines 7—7 of Fig. 6.

In Figs. 6 and 7 the construction of the compartment 35 is shown in detail. The walls of the compartment are preferably made of conducting material, such as copper or aluminum. An electromechanical vibrator 42 of the piezo electric crystal type is positioned in the holder 39 which is supported within the compartment 35 by the members 40 of cellular material. The piezo electric element 42 rests upon the holder base 39*a* which is of conductive material. A screw 39*b* is provided in the base 39*a* whereby connection may be made through the conductor 39*c*. A contact member 39*d* is arranged to contact with the upper face of the piezo electric element. A binding post 39*e* is positioned upon the top of the holder 39. Connections between the conductor 39*f*, which passes to the exterior of the compartment through the bushing 41, and the plate 39*d* are established through the binding post 39*e*.

In operation the fan 9 with the assistance of the baffle plates in the box provide a continuous circulation of air through the interior of the outer container 1. The air coming in contact with the mercury thermostat 15 causes the mercury column to rise or fall according to the temperature variations of the circulating air. If the temperature is low the thermostat causes the circuit through the heating unit 12 to be closed. The heated air is then circulated over the thermostat and the mercury in the thermostat is caused to rise and close the circuit between the electrodes 16 and 17. A positive potential is impressed upon the grid electrode of the electron discharge device 23 through the action of the source of supply C′. The source of grid bias potential C which normally maintains the grid electrode of the device 23 at a negative potential with respect to the cathode is rendered ineffective when the circuit through the thermostat is established. When a positive potential is impressed upon the grid electrode of the device 23 the anode current through the relay 22 is caused to increase and the armature 22*a* is drawn away from the contact 22*b*. The circuit of the heating unit 12 is then interrupted. When the circulating air in the container 1 cools the mercury in the thermostat 15 falls and the circuit of the source C′ is interrupted whereby the negative potential impressed upon the grid electrode of device 23 is again rendered effective. The anode circuit current decreases and the circuit of the heater 12 through the relay 22 is again closed. The temperature within the container 1 is thus maintained within 0.02 degree centigrade of a mean temperature.

The minute temperature variations are conducted rapidly over the entire surface of the outer copper wall of container 19. From the outer copper wall the heat is transmitted to the inner alternate walls of cellular material and copper and thence to the piezo electric element housing and holder. The walls of cellular material act to retain the heat and thus render it practically impossible to rapidly change the temperature within the piezo electric element housing from the exterior while the copper walls serve to evenly distribute the heat over the surfaces of the housing.

The composite walls not only aid in maintaining the average temperature constant, but also perform an important function in equalizing the temperature at all points within the containers. It is quite frequently the case that the walls of the outer container are affected by localized temperature differences, as by the rays of a beam of sunlight or a nearby transmitting tube. The metal layers of the wall serve to spread this heat by conduction, and to effect a temperature rise more evenly distributed throughout the container. Moreover, since the heating element 12 is located on one wall of the container 1 it results, despite the action of the fan and baffle, in an uneven heating of the walls of the inner container 19. The baffle 8 tends to reduce the direct radiation of heat, yet some radiant energy is passed therethrough to heat the wall of the container 19 nearest to the element 12. Furthermore the current of heated air circulated by the fan 9 strikes certain portions of the inner container more directly than others, resulting in a greater transfer of heat at those points. Conversely, when the heating element is inoperative, the current of air circulated by the fan results in more rapid cooling of some parts of the container 19 than others.

The various effects mentioned above would cause unequal temperatures at various points within the inner container 19, were it not for the equalizing effect of the composite walls. The metal layer tends to rapidly conduct the heat throughout itself as soon as there is a temperature gradient, while the insulating layer not only serves to prevent the transfer of any large amount of heat therethrough, but also interposes a delay action whereby any localized temperature gradients have time to spread by conduction, rather than passing directly through to the interior.

The importance of maintaining an equal temperature within all parts of the inner container 19 cannot be over emphasized, since not only must the temperature of the piezo electric crystal be maintained constant in order to prevent variations in the frequency of vibration, but also each portion of the crystal must be equal in temperature in order to prevent distortion. In order to ensure an equal temperature throughout the crystal it is necessary to maintain the inside walls of the interior container at an equal temperature at all points, since if one corner becomes hotter than another, for example, this inequality of temperature will be transmitted to the crystal.

The purpose of the outer container is to maintain the heat conducting medium therein, air in this specific embodiment, at a substantially equal temperature. This is done most conveniently by maintaining it at a temperature either above the highest room temperature to be encountered, or below the lowest since the heat flow will thus be unidirectional. A heating unit 12 is here provided to maintain the medium at a temperature considerably above normal room temperature, since the electrical input to the heating unit may be easily controlled by the thermostat 15 and its associated circuit. The medium within the container 1 may, however, be kept at a substantially constant low temperature by the use of a cooling coil and an associated control with equally good results as to control of the ultimate crystal temperature.

Despite the use of a finely adjusted control means for the heating unit and a fan and baffle as diffusing means, there are certain variations in temperature, for example fluctuations and inequalities in the temperature of the medium within the container 1. These fluctuations and inequalities are much further minimized by the structure of the inner container 19, comprising walls of alternate layers of heat conducting and heat insulating material, so that the temperature within that container is much more nearly perfectly constant and equalized. The metal layers, with their diffusing action resulting from their high conductivity and their heat retention due to high specific heat, cooperate with the layers of cellular insulating material with their resistance to the passage of heat therethrough, so that the combination secures the desired result of smoothing out the temperature fluctuations and reducing the inequalities.

The walls of the container 19 are shown as composed of alternate layers of heat conducting material, 19a, 32 and 34, such as copper or aluminum, having positioned therebetween layers of heat insulating material 31 and 33, such as wood pulp composition or phenol condensation products. It is to be noted, however, that the walls of the container 19 may be constructed the same or similar to the walls of the outer container 1 and be provided with air spaces or layers to serve as insulating material. It is to be noted, also, that by placing the holder 39 inside of the compartment 35, there is provided a layer of air between the outer walls of said holder 39 and the metal wall of the compartment 35, said layer of air serving, to a certain extent, as a wall of insulating material. It is to be noted that in the same manner there is a layer or wall of confined air between the outside of the metal wall of the compartment 35 and the inside of the container 19. It is to be seen, therefore, that the element 42 is enclosed by alternate walls of heat conducting and heat insulating material inside of the container 19. That is, the air around the holder 39 forms a wall of heat insulating material. Outside of this is the compartment 35 which is made of metal and, therefore, forms a wall of heat conducting material. Outside of this is the air inside of the container 19 which forms another wall of heat insulating material. Of course, as shown, the wall of the container 19, as above described, is itself formed of alternate layers of heat conducting and heat insulating material.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent of the United States is as follows:

1. In apparatus of the class described the combination of a container, the sides of said container comprising alternate walls of heat insulating and heat conducting material, a heating unit disposed in said container, a thermostat positioned in said container, said thermostat being associated with said heating unit, a second container positioned within said first mentioned container, means for supporting said second container from the walls of said first mentioned container, means positioned within said first mentioned container for circulating the heat conducting medium therein past said heating unit, said thermostat and around said second container, a baffle positioned in the region immediately adjacent the geometrical central point of said first mentioned container for guiding the circulation of said heat conducting medium over a predetermined course, said second mentioned container being positioned beneath said baffle.

2. In apparatus of the class described the combination of a container having sides composed of alternate layers of heat conducting and heat insulating material, a heating unit disposed in said container, a thermostat positioned within said container, said thermostat being connected with said heating unit, a second container having alternate walls of heat conducting and heat retaining material positioned within said first mentioned container, members of heat insulating material supporting said second container away from said first mentioned container, a third container having walls of conducting material positioned within said second container, means positioned within said first mentioned container for circulating the heat conducting medium therein, and a baffle for guiding the circulating medium over a predetermined course.

3. In apparatus of the class described the combination of a container, a heating unit disposed in said container, a thermostat positioned in said container, members of cellular material for supporting said thermostat, relays connected with said thermostat and said heating unit whereby said thermostat controls the operation of said heating unit, a second container positioned in said first mentioned container, the walls of said second container being composed of alternate layers of heat conducting and heat retaining material, a third container located within said second conductor, the walls of said third container being of heat conductive material, and an electromechanical vibrator element holder positioned within said third container.

4. In apparatus of the class described the combination of a container, a heating unit disposed in said container, a thermostat positioned in said container, said thermostat being connected to control the operation of said heating unit, means for agitating the heat conducting medium within said container, a baffle centrally disposed in said container for guiding the circulating medium over a predetermined course within said container, a second container positioned within said first mentioned container, said second container being supported by members of cellular material away from the walls of said first mentioned container, a plurality of containers within said second container and means within said containers for supporting an electromechanical vibrator element.

5. In apparatus of the class described the combination of a container having alternate walls thereof composed of heat conducting and heat retaining material, a heating unit disposed in said container, a thermostat positioned within said container, relays connected with said thermostat and said heating unit whereby said thermostat operates to govern the operation of said heating unit, a second container having alternate walls of heat conducting and heat retaining material positioned within said first mentioned container, a third container positioned within said second container, means positioned upon said third container for receiving a thermometer therein, and means for circulating the heat conducting medium within said first mentioned container.

6. In apparatus of the class described the combination of a container, a heating unit disposed in said container, a thermostat positioned in said container, said thermostat being connected with said heating unit whereby the operation of said heating unit is governed by the action of said thermostat, a second container positioned in said first mentioned container, a third container positioned within said second container, and means associated with said third container for retaining a thermometer.

7. Apparatus of the character described, including; a container comprising walls of alternate layers of heat conducting and heat insulating material; a heating unit disposed in said container; a thermostat positioned in said container, said thermostat electrically controlling said heating unit; a second container positioned within said first container, said second container being adapted to house therein a vibrator element having an electrical circuit associated therewith, said second container comprising walls of alternate layers of heat conducting and heat insulating material; means for supporting said second container from the walls of said first mentioned container; a fan within said first container for circulating a heat conducting medium therein; a baffle within said first container for guiding the circulation of said heat conducting medium over a predetermined course, said second mentioned container being positioned beneath said baffle.

8. Apparatus of the character described, including; a container comprising alternate walls of heat conducting and heat insulating material; a heating unit disposed in said container; heat responsive means positioned in said container, whereby said heating unit is controlled; and a second container comprising alternate walls of heat conducting and heat insulating material positioned within said first container, said second container being adapted to house therein a vibrator element.

9. In apparatus of the class described, the combination of a container, a heating unit disposed in said container, a thermostat positioned in said container, said thermostat being connected with said heating unit whereby the operation of said heating unit is governed by the action of said thermostat, a second container positioned in said first mentioned container, said second container comprising walls of alternate layers of heat conducting and heat insulating material, and a third container adapted to contain an electrically responsive crystal, said third container being positioned within said second container.

10. Apparatus of the character described, including; a container comprising walls of alternate layers of heat conducting and heat insulating material; a heating unit disposed in said container; a thermostat positioned in said container, said thermostat electrically controlling said heating unit; a second container positioned within said first container, said second container being adapted to house therein a vibrator element having an electrical circuit associated therewith, said second container comprising walls of alternate layers of heat conducting and heat insulating material; means for supporting said second container from the walls of said first mentioned container; and a fan within said first container for circulating a heat conducting medium therein.

ALFRED CROSSLEY.